(12) United States Patent
Koskinen et al.

(10) Patent No.: US 10,659,976 B2
(45) Date of Patent: May 19, 2020

(54) PAGING ENHANCEMENT FOR SIGNALING OPTIMIZATION

(71) Applicant: NOKIA TECHNOLOGIES OY, Espoo (FI)

(72) Inventors: Jussi-Pekka Koskinen, Oulu (FI); Ilkka Keskitalo, Oulu (FI); Jarkko T. Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 5 days.

(21) Appl. No.: 15/197,048

(22) Filed: Jun. 29, 2016

(65) Prior Publication Data

US 2018/0007567 A1    Jan. 4, 2018

(51) Int. Cl.
| | |
|---|---|
| *H04W 36/00* | (2009.01) |
| *H04W 24/02* | (2009.01) |
| *H04L 5/00* | (2006.01) |
| *H04W 4/70* | (2018.01) |
| *H04W 36/30* | (2009.01) |
| *H04W 76/27* | (2018.01) |
| *H04W 36/08* | (2009.01) |
| *H04W 68/02* | (2009.01) |
| *H04W 88/02* | (2009.01) |
| *H04W 88/16* | (2009.01) |

(52) U.S. Cl.
CPC ........... *H04W 24/02* (2013.01); *H04L 5/0055* (2013.01); *H04L 5/0094* (2013.01); *H04W 4/70* (2018.02); *H04W 36/08* (2013.01); *H04W 36/305* (2018.08); *H04W 68/02* (2013.01); *H04W 76/27* (2018.02); *H04W 88/02* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 8,515,462 | B2 | 8/2013 | Courau et al. |
| 2013/0015953 | A1 | 1/2013 | Hsu et al. |
| 2013/0039287 | A1 | 2/2013 | Rayavarapu et al. |

(Continued)

FOREIGN PATENT DOCUMENTS

| | | |
|---|---|---|
| EP | 3 413 681 A1 | 12/2018 |
| WO | 2015043958 A1 | 4/2015 |

(Continued)

OTHER PUBLICATIONS

Huawei, "Introduction of NB-IoT," 3GPP TSG-RAN WG2 Meeting #94, R2-164415, Nanjing, P.R. China, May 23-27, 2016, 56 pages.

(Continued)

*Primary Examiner* — Suhail Khan
(74) *Attorney, Agent, or Firm* — Squire Patton Boggs (US) LLP

(57) ABSTRACT

Various communication systems may benefit from optimizations, such as signaling optimizations. For example, certain wireless communication systems may benefit from paging enhancement for signaling optimization. A method can include identifying, by a network element, a procedure to be used by a user equipment as a response to a paging message. The method can also include indicating the procedure from the network element to the user equipment.

22 Claims, 4 Drawing Sheets

(56) References Cited

U.S. PATENT DOCUMENTS

| | | | |
|---|---|---|---|
| 2013/0155954 A1 | 6/2013 | Wang et al. | |
| 2015/0080006 A1* | 3/2015 | Ohta | H04W 72/042 |
| | | | 455/452.1 |
| 2015/0195831 A1 | 7/2015 | Du et al. | |
| 2016/0128007 A1 | 5/2016 | Keskitalo et al. | |
| 2016/0165572 A1* | 6/2016 | Chang | H04L 12/66 |
| | | | 455/458 |
| 2016/0302153 A1* | 10/2016 | Martin | H04W 52/0212 |

FOREIGN PATENT DOCUMENTS

| | | |
|---|---|---|
| WO | 2015/062692 A1 | 5/2015 |
| WO | 2016056954 A1 | 4/2016 |
| WO | 2016/068776 A1 | 5/2016 |

OTHER PUBLICATIONS

Ericsson, "Introduction of the UE context resume function," 3GPP TSG RAN WG3 Meeting #92, R3-161433, Nanjing, P.R. China, May 23-27, 2016, 8 pages.

Nokia et al., "Paging for Light connection," 3GPP TSG-RAN WG2 Meeting #94, R2-163888, Nanjing, China, May 23-27, 2016, 6 pages.

Samsung, "Design principles and considerations for the LTE light connection," 3GPP TSG-RAN WG2 Meeting #94, R2-163450, Nanjing, China, May 23-27, 2016, 4 pages.

Huawei et al., "On RAN initiated paging," 3GPP TSG-RAN WG2 Meeting #94, R2-163932, Nanjing, China, May 23-27, 2016, 5 pages.

International Search Report and Written Opinion International Application PCT/FI2017/050380 dated Aug. 11, 2017.

Japanese Office Action corresponding to JP Appln. No. 2018-563517, dated Oct. 30, 2019.

Nokia, Alcatel-Lucent Shanghai Bell, "Paging for light connection", 3GPP TSG-RAN WG3 Meeting #92, Nanjing, China, May 23-27, 2016, R3-161352, 6 pages.

Japanese Office Action corresponding to JP Appln. No. 2018-563517, dated Feb. 5, 2020.

Extended European Search Report corresponding to EP Appln. No. 17819405.6, dated Jan. 20, 2020.

* cited by examiner

PAGING ENHANCEMENT FOR SIGNALING OPTIMIZATION

BACKGROUND

Field

Various communication systems may benefit from optimizations, such as signaling optimizations. For example, certain wireless communication systems may benefit from paging enhancement for signaling optimization.

Description of the Related Art

Third generation partnership project (3GPP) has work items (WI) for narrow band internet of things (NB-IOT) and for signaling reduction by allowing user equipment (UE) centric mobility with light connection (LC) to the network.

In both cases there will be a UE mode in which the radio resource control (RRC) connection is kept but the UE is allowed to move between cells by re-selections, the same way as in idle. For NB-IOT such feature is implemented by defining connection suspend/resume signaling. For mobile terminated (MT) data transmission, after suspension the connection is resumed by sending first a paging message followed by a connection resume procedure.

With the "light connection" (LC) it is still open what signaling will be used to enter the UE centric mobility mode and how to return to normal RRC connected state. The suspend/resume signaling could be a possibility for LC too. The main target of the LC WI is to minimize signaling load. Hence, the explicit messages for the connection suspension/resumption may not result in optimized control signaling.

Alternatively, the LC procedures could use existing signaling. Thus, the LC procedures could allow autonomous entry to the LC mode and return to RRC connected with re-establishment signaling.

FIG. 1 illustrates an example for signaling for MT data when UE is light connected. As shown in FIG. 1, initially the UE is RRC connected, with a data connection through eNB #1. Then, a data transmission ends and UE is indicated to enter light connected state. UE context is stored both in the UE and in eNB #1.

During this light connected state, the UE may have a cell re-selection from eNB #1 to eNB #2. This re-selection may occur without notice to the MME/SGW.

At some point, MT data can arrive. Thus, the S-GW can initiate paging via MME toward the UE. This paging can be carried out via eNB #1 or a cluster of cells also including, for example, eNB #2.

Accordingly, the UE can send an RRC Connection Re-Establishment Request. Connection re-establishment can then proceed with communication to eNB #2. The process can include providing a radio link failure (RLF) indication to eNB #1 and receiving a handover request with user equipment context. Subsequently, MME/S-GW can be made aware of the connection to eNB #2, which can switch the DL path and then provide RRC and data connection through eNB #2.

An alternative signaling is that the UE send a connection resume request as response to the paging. With NB-IOT it is followed by context request from the old serving cell. FIG. 2 illustrates an example of connection resumption with NB-IOT.

As shown in FIG. 2, a UE can send an RRC connection resumption request, RRC Connection Resume Request, to a new eNB. The new eNB can then retrieve the UE's context from the old eNB and send a switch request to the MME. Moreover, the new eNB can also send a context release message to the old eNB.

SUMMARY

According to certain embodiments, a method can include identifying, by a network element, a procedure to be used by a user equipment as a response to a paging message. The method can also include indicating the procedure from the network element to the user equipment.

In certain embodiments, a method can include receiving an indication of a procedure to be used as a response to a paging message. The method can also include responding to the paging message based on the indication.

An apparatus, according to certain embodiments, can include at least one processor and at least one memory including computer program code. The at least one memory and the computer program code can be configured to, with the at least one processor, cause the apparatus at least to identify, by a network element, a procedure to be used by a user equipment as a response to a paging message. The at least one memory and the computer program code can also be configured to, with the at least one processor, cause the apparatus at least to indicate the procedure from the network element to the user equipment.

An apparatus, in certain embodiments, can include at least one processor and at least one memory including computer program code. The at least one memory and the computer program code can be configured to, with the at least one processor, cause the apparatus at least to receive an indication of a procedure to be used as a response to a paging message. The at least one memory and the computer program code can also be configured to, with the at least one processor, cause the apparatus at least to respond to the paging message based on the indication.

According to certain embodiments, an apparatus can include means for identifying, by a network element, a procedure to be used by a user equipment as a response to a paging message. The apparatus can also include means for indicating the procedure from the network element to the user equipment.

In certain embodiments, an apparatus can include means for receiving an indication of a procedure to be used as a response to a paging message. The apparatus can also include means for responding to the paging message based on the indication.

A computer program product, according to certain embodiments, can encode instructions for performing a process. The process can include any of the above-described methods.

A non-transitory computer-readable medium can, in certain embodiments, be encoded with instructions that, when executed in hardware, perform a process. The process can include any of the above-described methods.

BRIEF DESCRIPTION OF THE DRAWINGS

For proper understanding of the invention, reference should be made to the accompanying drawings, wherein.

DETAILED DESCRIPTION

Figure 1:
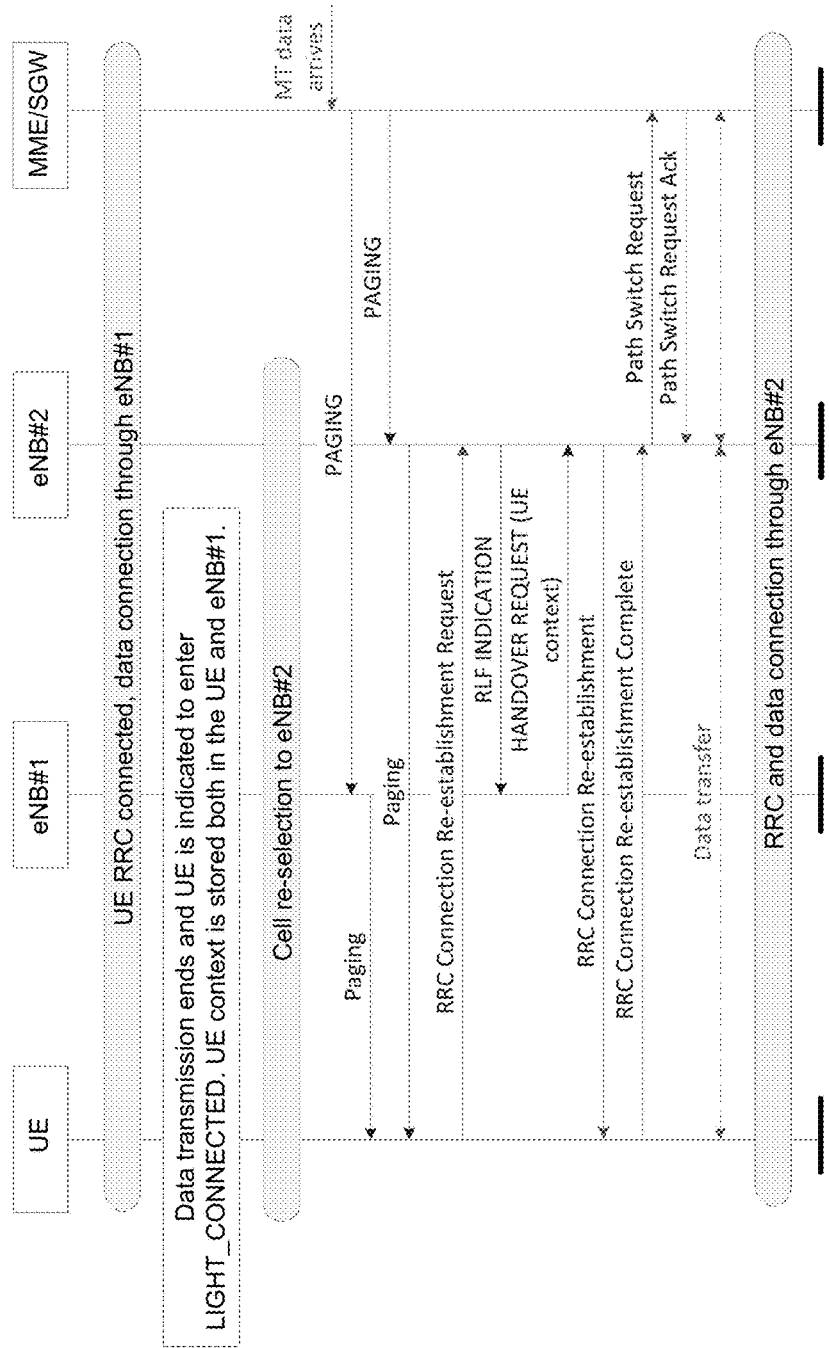
FIG. 1 illustrates an example for signaling for MT data when UE is light connected.
Figure 2:
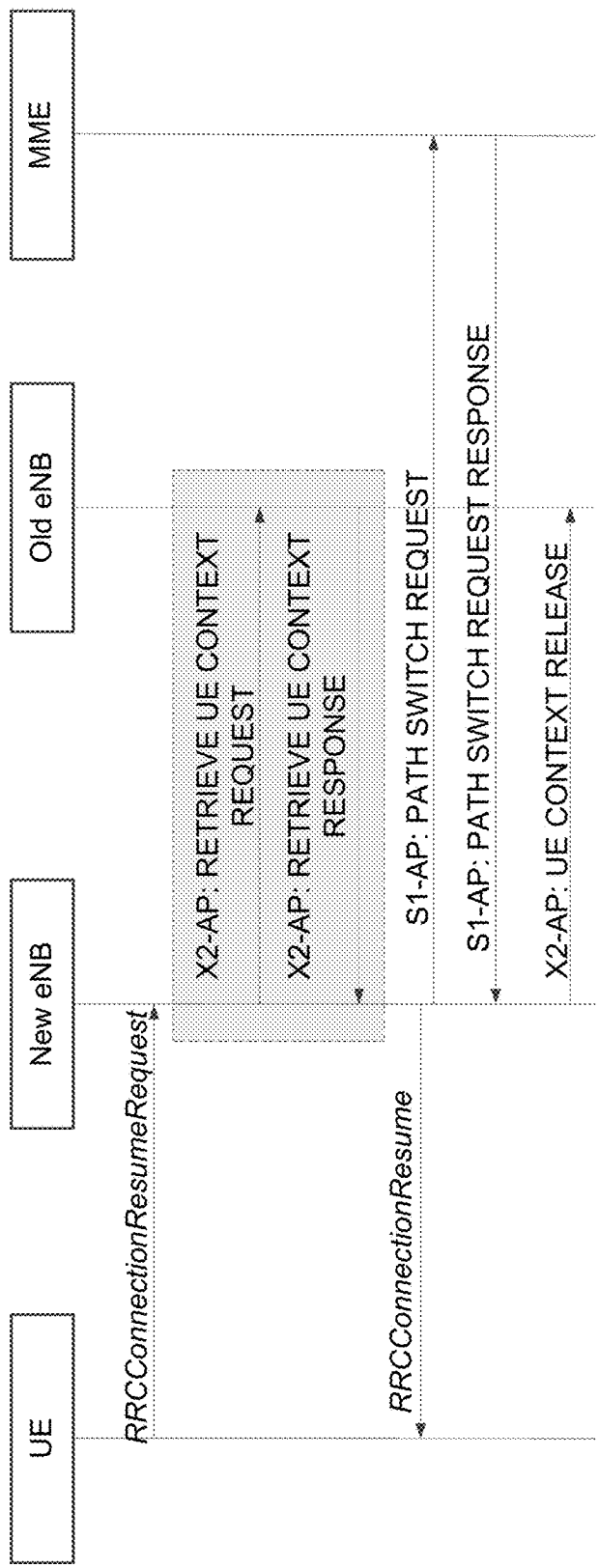
FIG. 2 illustrates an example of connection resumption with NB-IOT.

Certain embodiments may permit dynamic selection of a suitable signaling procedure in order either to minimize signaling or to utilize specific UE capabilities without always limiting to legacy operation. Furthermore, certain embodiments may permit a network to be able to select a suitable procedure, for example in a case where UE context may not be available or where UE context cannot be fetched from the previous cell.

Thus, in certain embodiments, a paging message can be extended to indicate a procedure to be used as response to the paging. The network may instruct a UE to continue with a desired signaling procedure by including suitable indication in the paging message sent over the Uu interface. Indication in the paging may be realized using an explicit or implicit mechanism.

For example, a NB-IOT UE can be paged with an indication to use either RRC connection setup request or RRC connection resume request or RRC re-establishment request. Alternatively, less dynamically the UE can receive such an indication in, for example, system information block (SIB)/ATTACH/RRC dedicated signaling.

RRC Connection setup request procedure can be used when the UE context is either not available or cannot be fetched, RRC connection resumption signaling can be used in other cases.

In another example, a UE in light connection can be instructed to proceed either with connection resume signaling, for example if an explicit message was used to suspend the earlier connection, or using a connection re-establishment procedure. The latter case may be relevant in case not all radio access network (RAN) nodes, such as eNBs, within the light connection area are not supporting connection suspend/resume with related context request/response signaling using specific resume-id to refer to the stored context.

Implicit mechanisms can also be used. For example, the UE can determine the procedure to be used as response to the paging based on a variety of indications in the paging message.

For example, the implicit indication can be an indication of data via control plane (CP). In that case, the UE response may be RRC Connection Request. Alternatively the implicit indication may be an indication of data via user plane (UP). In that case, the UE response may be RRC Connection Resume Request. In another example, the implicit indication may be an indication of normal data. In that case, the UE response may be RRC Connection Request or RRC Connection Resume Request, depending on whether the RRC connection of the UE has been suspended.

Another implicit indication can be an indication of small data/short connection. In this case, the UE response may be RRC Connection Resume Request for data via CP.

A further implicit indication may be high/low priority data. The UE may select any response type depending, for example, on whether the RRC connection has been suspended or, for another example, based on the UE capabilities to support different mechanisms.

An additional implicit indication can relate to preceding signaling or UE capabilities. All response types may be applicable, depending on whether the RRC connection has been suspended or based on the UE capabilities to support different mechanisms.

There are various procedures that can be used by the user equipment in view of the indication. For example, the procedure can include RRC connection setup. Thus, the UE can send an RRC connection request as a response to the paging. In another example, the procedure can include RRC connection resume, a resumption of an RRC connection. The UE can send an RRC connection resume request as a response to the paging. In a further example, the procedure can include RRC connection re-establishment. The UE can send an RRC connection re-establishment request as a response to the paging. Other procedures are also permitted.

The selection of the signaling procedure can be based on the UE awareness of the availability of the context in the serving cell, which can be the paging cell. This selection can be made without explicit indication in the paging message. The availability can be either stored context at the serving cell, or the possibility to fetch the context from the old serving cell. Either of these situations can be considered as the context being available to the serving cell.

Figure 3:
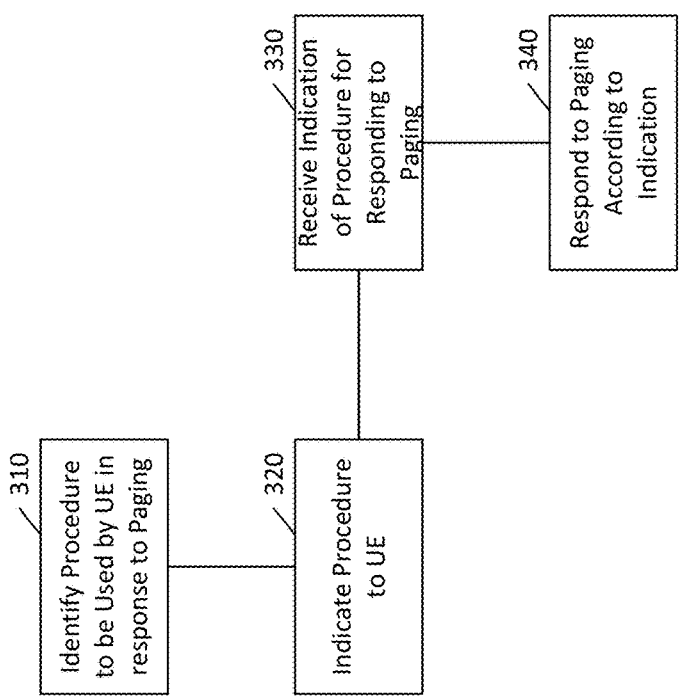
FIG. 3 illustrates a method according to certain embodiments.

FIG. 3 illustrates a method according to certain embodiments. As shown in FIG. 3, a method can include, at 310, identifying, by a network element, a procedure to be used by a user equipment as a response to a paging message. The procedure can be identified in a variety of ways, such as based on availability of context of the user equipment or based on how a previous connection was suspended.

The method can also include, at 320, indicating the procedure from the network element to the user equipment. The indicating the procedure can be performed in the paging message or in dedicated signaling. The indicating can be done using an explicit indication or an implicit indication.

An explicit indication can be or include an indication to use one of a radio resource control connection setup request, a radio resource control connection resume request, or a radio resource control re-establishment request.

The implicit indication can include at least one of data via control plane, data via user plane, normal data, small data, short connection, high priority data, low priority data, preceding signaling or UE capabilities.

The method can also include, at 330, receiving an indication of a procedure to be used as a response to a paging message. This can be the same indication sent at 320. As mentioned above, the indication may be received in a paging message or dedicated signaling and may be explicit or implicit. The explicit indication can include an indication to use one of a radio resource control connection setup request, a radio resource control connection resume request, or a radio resource control re-establishment request.

The method can further include, at 340, responding to the paging message based on the indication. Responding to the paging message can include selection of a signaling procedure based on availability of context of the user equipment in a serving cell without an explicit indication in the paging message.

Figure 4:
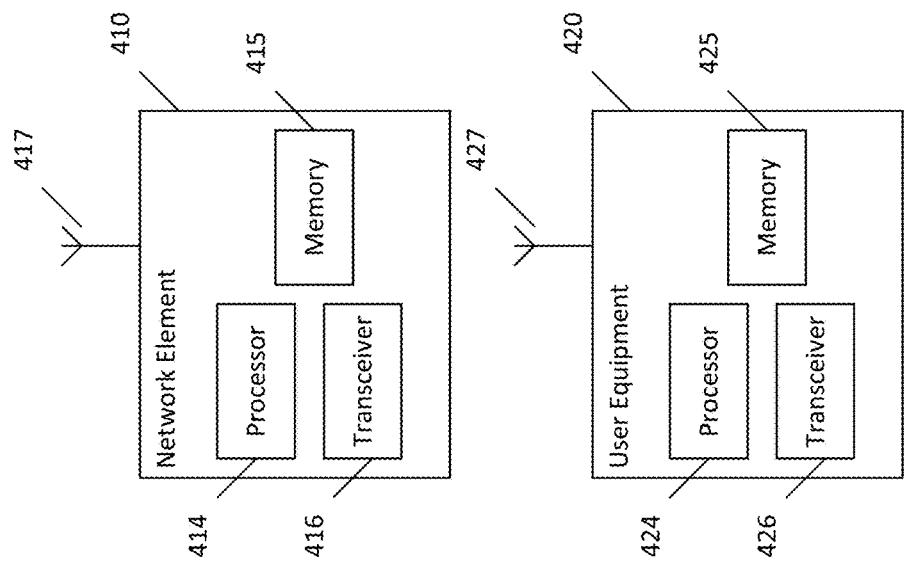
FIG. 4 illustrates a system according to certain embodiments.

FIG. 4 illustrates a system according to certain embodiments of the invention. It should be understood that each block of the flowchart of FIG. 3 may be implemented by various means or their combinations, such as hardware, software, firmware, one or more processors and/or circuitry. In one embodiment, a system may include several devices, such as, for example, network element 410 and user equipment (UE) or user device 420. The system may include more than one UE 420 and more than one network element 410, although only one of each is shown for the purposes of illustration. A network element can be an access point, a base station, an eNode B (eNB), or any other network element.

Each of these devices may include at least one processor or control unit or module, respectively indicated as 414 and 424. At least one memory may be provided in each device, and indicated as 415 and 425, respectively. The memory may include computer program instructions or computer code contained therein, for example for carrying out the embodiments described above. One or more transceiver 416 and 426 may be provided, and each device may also include an antenna, respectively illustrated as 417 and 427. Although only one antenna each is shown, many antennas and multiple antenna elements may be provided to each of the devices. Other configurations of these devices, for example, may be provided. For example, network element 410 and UE 420 may be additionally configured for wired communication, in addition to wireless communication, and in such a case antennas 417 and 427 may illustrate any form of communication hardware, without being limited to merely an antenna.

Transceivers 416 and 426 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 420 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 420 may be a sensor or smart meter, or other device that may usually be configured for a single location.

In an exemplifying embodiment, an apparatus, such as a node or user device, may include means for carrying out embodiments described above in relation to FIG. 3.

Processors 414 and 424 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 415 and 425 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 410 and/or UE 420, to perform any of the processes described above (see, for example, FIG. 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments of the invention may be performed entirely in hardware.

Furthermore, although FIG. 4 illustrates a system including a network element 410 and a UE 420, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

NB-IOT Narrow Band Internet of Things
RRC Radio resource control
MT Mobile Terminated
LC Light Connection
UE User Equipment
Uu Radio interface between UE and eNB
eNB Enhanced NodeB

We claim:

1. A method comprising:
   identifying, by a network element, a signaling procedure to be used by a user equipment as a response to a paging message, wherein the signaling procedure is identified based on how a previous connection was suspended; and
   indicating the signaling procedure from the network element to the user equipment, wherein the indication comprises using one of a radio resource control connection setup request and a radio resource control connection resume request.

2. The method of claim 1, wherein the indicating the signaling procedure comprises indicating the signaling procedure in the paging message or in dedicated signaling.

3. The method of claim 1, wherein the indication is sent on system information during an attach procedure.

4. The method of claim 1, wherein the signaling procedure is identified based on availability of context of the user equipment.

5. The method of claim 1, wherein the indicating comprises an implicit indication.

6. The method of claim 5, wherein the implicit indication comprises at least one of data via control plane, data via user plane, normal data, small data, short connection, high priority data, low priority data, or signaling.

7. A method comprising:
  receiving an indication of a signaling procedure to be used as a response to a paging message, wherein the signaling procedure is identified based on how a previous connection was suspended; and
  responding to the paging message based on the indication, wherein the indication comprises using one of a radio resource control connection setup request and a radio resource control connection resume request.

8. The method of claim 7, wherein the indication is received in the paging message or in dedicated signaling.

9. The method of claim 7, wherein the indication is received on system information during an attach procedure.

10. The method of claim 7, wherein the indication comprises an implicit indication.

11. The method of claim 10, wherein responding to the paging message comprises selection of the signaling procedure based on availability of context of the user equipment in a serving cell without an explicit indication in the paging message.

12. An apparatus comprising:
  at least one processor; and
  at least one memory including computer program code,
    wherein the at least one memory and the computer program code are configured to, with the at least one processor, cause the apparatus at least to
  identify a signaling procedure to be used by a user equipment as a response to a paging message, wherein the signaling procedure is identified based on how a previous connection was suspended; and
  indicate the signaling procedure from the apparatus to the user equipment, wherein the indication comprises using one of a radio resource control connection setup request and a radio resource control connection resume request.

13. The apparatus of claim 12, wherein indicating the signaling procedure comprises indicating the signaling procedure in the paging message or in dedicated signaling.

14. The apparatus of claim 12, wherein the indication is sent on system information during an attach procedure.

15. The apparatus of claim 12, wherein the signaling procedure is identified based on availability of context of the user equipment.

16. The apparatus of claim 12, wherein the indicating comprises an implicit indication.

17. The apparatus of claim 16, wherein the implicit indication comprises at least one of data via control plane, data via user plane, normal data, small data, short connection, high priority data, low priority data, or signaling.

18. An apparatus comprising:
  at least one processor; and
  at least one memory including computer program code,
    wherein the at least one memory and the computer program code are configured to, with the at least one processor, cause the apparatus at least to
  receive an indication of a signaling procedure to be used as a response to a paging message, wherein the signaling procedure is identified based on how a previous connection was suspended; and
  respond to the paging message based on the indication, wherein the indication comprises using one of a radio resource control connection setup request and a radio resource control connection resume request.

19. The apparatus of claim 18, wherein the indication is received in the paging message or in dedicated signaling.

20. The apparatus of claim 18, wherein the indication is received on system information during an attach procedure.

21. The apparatus of claim 18, wherein the indication comprises an implicit indication.

22. The apparatus of claim 21, wherein responding to the paging message comprises selection of the signaling procedure based on availability of context of the user equipment in a serving cell without an explicit indication in the paging message.

* * * * *